United States Patent Office 3,462,371
Patented Aug. 19, 1969

3,462,371
NUCLEAR REACTOR FUEL
John A. L. Robertson, Deep River, Ontario, Canada, assignor to Atomic Energy of Canada Limited, Ottawa, Ontario, Canada, a company of Canada
No Drawing. Continuation-in-part of application Ser. No. 419,226, Dec. 17, 1964. This application Mar. 9, 1967, Ser. No. 621,787
Int. Cl. G21c *19/42*
U.S. Cl. 252—301.1        3 Claims

ABSTRACT OF THE DISCLOSURE

The present invention describes a technique for converting a shaped ceramic nuclear fuel mass comprising a hyperstoichiometric dioxide of a metal selected from the group consisting of uranium, plutonium, thorium and mixtures thereof to a hypostoichiometric state. The shaped mass is coated with a thin layer of carbon, then annealed at above about 1,500° C. in vacuo or an inert gas atmosphere until the carbon coating has been substantially removed by reaction with the substrate, thereby producing the desired hypostoichiometric state.

---

The present application is a continuation-in-part of Ser. No. 419,226, filed Dec. 17, 1964, now Patent 3,354,044 and of Ser. No. 310,846, filed Sept. 23, 1963, now abandoned.

The thermal conductivity of nuclear reactor fuels is an important consideration in the design of fuel elements. A high thermal conductivity is desirable since heat generation rates of the fuel elements can be increased to give high performance without exceeding core temperature limits. One fuel material commonly used is uranium dioxide by itself or mixed with other fuel materials (particularly other oxides). In the context of this application the term dioxide includes those of nonstoichiometric composition. The O/U ratio in uranium dioxide fuel is usually reduced during manufacture to below about 2.025, preferably to about 2.01 or less. This reduction is found to be desirable to obtain stable high performance. The use of an O/U ratio below 2 has not previously been advocated for fuel elements.

The thermal conductivity of uranium dioxide at elevated temperatures (e.g., above about 400° C.) has been found to be increased if the dioxide is treated to lower the O/U ratio to below 2 and give a hypostoichiometric dioxide. The basic crystalline structure of the dioxide is believed to be maintained after treatment, but the lattice network is deficient in oxygen. The overall thermal conductivity can be increased, by the process of the present invention.

This removal of oxygen may be accomplished by various suitable methods of which the following are examples:

(a) Heating the uranium dioxide material in a vacuum or in a low partial pressure of oxygen to cause a self-diffusion of oxygen from the material. The temperature may range from about 1,500° C. to about 2,200° C. A getter material may be inserted in the system to combine with the diffused oxygen. The getter should maintain a lower partial pressure of oxygen than that in equilibrium with stoichiometric $UO_2$ at the treatment temperature of the dioxide material.

(b) Associating with the uranium dioxide material a getter substance which will preferentially combine with oxygen. Suitable substances include the fuel metal itself (unoxidized) graphite, tantalum, molybdenum, tungsten, and mixtures thereof.

The getter may be at a higher or lower temperature than the dioxide material, the difference in temperature being selected to provide a suitable oxygen partial pressure—which allows control of the process. The above identified getter substances are elements or compounds which are in equilibrium with a suitable low partial pressure of oxygen, and which are stable at the operating temperatures. During subsequent handling and processing it is necessary to prevent re-oxidation of the hypostoichiometric uranium dioxide. Desirably, any later operations at elevated temperatures are carried out in the absence of oxygen, or a protective coating or atmosphere is maintained around the material. In some applications it may be desirable to assure the prevention of re-oxidation during prolonged used by associating a getter substance with the fabricated hypostoichiometric uranium dioxide.

The hypostoichiometric uranium dioxide may be defined as defect structure $UO_{2-x}$ where $x$ may range from above zero up to about 0.3 or more. Usually $x$ will have the value of 0.01 to 0.1.

The present invention is applicable to dioxides other than uranium alone, e.g., $UO_2$-$PuO_2$ mixtures, $UO_2$-$ThO_2$ mixtures, $ThO_2$-$PuO_2$ mixtures and $UO_2$-$ZrO_2$ mixtures. One oxide mixture particularly suited to the present invention is the $UO_2$-refractory $PuO_2$ mixture described in U.S. Ser. No. 213,035 filed July 27, 1962, now Patent No. 3,254,030, Michaud et al. The improved thermal conductivity of the dioxide matrix when treated according to the present invention, would decrease the homogenization of the $PuO_2$ particles.

The incorporation of the treated $US_{2-x}$ material in nuclear reactor fuel elements would permit a considerably higher power generation (then for stoichiometric or hyperstoichiometric dioxide) for the same maximum operating temperatures. Alternatively, lower temperatures could be maintained in hypostoichiometric material for a given power generation.

Suitable fuel elements according to the present invention include:

(1) Those wherein at least all of the core of the fissionable material is initially a hypostoichiometric dioxide. Preferably the complete doxide fuel is initially hypostoichiometric.

(2) Those wherein a stoichiometric or hyperstoichiometric dioxide is assembled in contact or proximity with a getter substance such as tantalum, uranium, or graphite so that at elevated operating temperatures the getter will extract and combine with oxygen and form hypostoichiometric dioxide in situ. For instance in cylindrical fuel elements the getter could be disc end plates or a central or axial core.

(3) Those wherein hypostoichiometric dioxide is used ing conjunction with a getter in the manner of (2) above to assure maintenance of the hypostoichiometry.

Practice of the present invention commences then with an already shaped ceramic mass of a hyperstoichiometric dioxide of a metal selected from the group consisting of uranium, plutonium, thorium, and mixtures thereof. The shaped ceramic mass, e.g., pellets, is carbon coated and thereafter heat treated at a temperature of above about 1,500° C. under at least substantially oxygen-free deoxygenating conditions until substantially all of the carbon has been reacted away. A preferred technique is painting the shaped mass with a graphite dispersion then heating in vacuo or an argon atmosphere. The carbon of the coating reacts with the dioxide substrate to create a partly hypostoichiometric dioxide condition. Desirably all of the carbon will react away, but often close examination of the ceramic mass will show small carbon inclusions at the surface thereof. The carbon applied as coating should not exceed about 1% by weight of the shaped mass. It may be noted by way of explanation tht continued gettering action here is not desired. A residue even of relatively small quantities of carbon is disadvantageous in the ceramic mass of the final fuel element because conditions in the nuclear reactor may cause interreaction of the carbon and the metal dioxide with consequent evolution of gaseous reaction products.

The following examples will serve to illustrate the invention:

Example 1

A uranium dioxide polycrystalline sinter (sintered in hydrogen at 1,650° C.) having an O/U ratio of 2.005 was machined into cylindrical specimens of 3.5 mm. diameter and 12 mm. length. One of these cylinders was retained as control and one was heat treated in a closed furnace resistance heated by tantalum elements. The tantalum acted as getter and maintained an environment with a low partial pressure of oxygen around the cylindrical specimen. The specimen was heated at 2,000° C. for one hour. Metallography (room temperature) revealed the presence of free uranium (about 1 vol. percent) in very finely divided form (about 1 micron) dispersed throughout the specimen indicated an O/U ratio of 1.98. At elevated operating temperatures it is believed tht the free uranium effectively dissolves giving a continuous defect structure $UO_{2-x}$.

Example 2

Fused crystalline $UO_2$ produced by arc fusion in an inert atmosphere was studied metallographically at room temperature and the presence of free uranium observed. This hypostoichiometric material was divided into two specimens, one of which was annealed in moist hydrogen for about one hour at 1,650° C. Subsequent metallography (room temperature) showed that the free uranium had been removed by this treatment without otherwise changing the structure. These two specimens were then compared in the thermal conductivity apparatus described in Example 1. It was again found that the hypostoichiometric specimen had the higher conductivity—by the same amount as in Example 1.

Example 3

Hypostoichiometric compositions were also produced from stoichiometric or hyperstoichiometric sinters using graphite instead of tantalum. The graphite was used in a vacuum furnace providing continuous removal of the gaseous by-products. The hypostoichiometric composition having improved thermal conductivity was obtained both when the dioxide material being treated was in solid contact with the graphite, and when they were separated. Mixtures of tantalum and graphite have also been found to be effective getters.

An effective furnace treatment has been carried out on sintered stoichiometric pellets of $UO_2$ (0.75 inch in diameter by 0.75 inch long) by holding for two hours at 2,000° C. in a vacuum. The furnace was continuously evacuated, providing a vacuum of better than $10^{-5}$ mm. Hg at room temperature, but the pressure increasing rapidly during operation. The heating elements were tantalum and the pellets were in a graphite crucible. After the two-hour treatment, sample pellets were anlyzed by controlled ignition to $U_3O_8$ and were found to have O/U atomic ratios of 1.99.

Example 4

In this example an irradiation experiment was carried out to compare the thermal conductivity and thermoelectric properties of hypo- and hyperstoichiometric uranium dioxide. Geometrically similar elements containing hypo- ($UO_{1.98}$) and hyperstoichiometric ($UO_{2.007}$) uranium dioxide of identical enrichment were irradiated side-by-side at three flux levels for a comparison of the effective thermal conductivities and thermoelectric properties. Each element had a molybdenum-sheathed, central thermo-couple (W/W–26% Re). This was electrically insulated from the fuel element sheath, permitting a measurement of central temperature, thermoelectric EMF and electrical resistance from fuel centre to sheath.

The post-irradiation inspection of the nine elements from this charge showed no evidence of micro-structural change on fractured cross-sections, an observation consistent with the thermal history.

The hypostoichiometric elements had lower central temperatures throughout the irradiation. The difference between the two compositions, about 50° C. at the start, had increased to about 300° C. at a temperature of 1,500° C. by the end of the 27-day irradiation. There was an apparent gradual decrease in the effective thermal conductivity of the $UO_{2.007}$ fuel, which behaved as a "p" type semi-conductor throughout the irradiation. Initially the $UO_{1.98}$ was n-type at low temperatures, but after a short annealing period it was p type below a temperature of about 600° C., and n type above this temperature. The electrical resistance readings were variable, but the $UO_{1.98}$ had consistently smaller values at any given central temperature. The maximum potential developed between central probe and sheath by either hypo- or hyperstoichiometric material was about 400 mv. and occurred for upper temperatures around 1,300° C.

This experiment has established:

(1) Significant benefit by virtue of lower fuel temperatures can be obtained from the use of hypostoichiometric $UO_2$ in conventional reactor applications.

(2) The benefit persists, and may even increase, during irradiation to the maximum exposure yet tested of $10^{19}$ fissions/cm.³.

In other experiments batches of uranium dioxide pellets heated in a vacuum at 2,000° C. in the presence of graphite (but not in contact with it) analyzed $UO_{1.97}$ to $UO_{1.99}$, but material losses of the uranium dioxide of the order of 5 wt. percent occurred (due to volatilization). In order to overcome this difficulty the sintered $UO_2$ pellets may be coated with carbonaceous materials and reduced to hypostoichiometry at temperatures well below 2,000° C. In the following examples sintered $UO_2$ pellets were coated with graphite from a dispersion of colloidal graphite in alcohol.

Example 5

$UO_2$ pellets of 0.75 in. diameter and 0.75 in. length were coated with colloidal graphite in alcohol and dried in air at 80° C., the coating process being repeated as often as necessary to obtain the required thickness (weight) of coating. Annealing was then carried out at 1,830–1,840° C. for three hours in a vacuum of $10^{-4}$ to $10^{-5}$ torr. Analysis was by weight change on oxidation of samples to $U_3O_8$ at 900° C. With a graphite coating of 0.15 weight percent, an O/U ratio of 1.981 and a carbon content of less than 20 p.p.m. was obtained. With a coating of 0.25 wt. percent graphite, an O/U ratio of 1.997 and a carbon content of less than 20 p.p.m. were obtained. With a coating of 0.35 wt. percent, an O/U ratio of 1.973 was obtained. Above about 0.8 wt. percent, an O/U ratio of 1.973 was obtained. Above about 0.8 wt. percent graphite the retained carbon content becomes significant (greater than about 100 p.p.m.). Tests with 1 and 2 wt. percent graphite yielded O/U ratio of 1.910 and 1.820 respectively, but the carbon contents were 140 and 15,000 p.p.m. respectively with large globules of uranium metal appearing on the pellet surfaces.

Example 6

The effect of annealing temperature has been investigated on 0.75 in. diameter $UO_2$ pellets coated with 0.25 wt. percent graphite, and vacuum annealed at various temperatures for three hours. The results are summarized in the following table:

| Annealing temp., °C. | O/U ratio |
|---|---|
| 1,400 | 2.009 |
| 1,600 | 1.987 |
| 1,830 | 1.979 |
| 1,840 | 1.978 |
| 1,850 | 1.976 |
| 1,880 | 1.977 |
| 1,900 | 1.974 |

The O/U ratio begins to level off at about 1.975 in the temperature range 1850–1900° C. It is not desirable to use temperatures much above 1,900° C. since material loss by volatilization becomes significant and a regular pellet shape cannot be maintained.

Example 7

The effect of pellet diameter at a graphite coating level of 0.25 wt. percent and constant time and temperature, is as follows:

| Pellet diameter, In. | O/U ratio |
|---|---|
| 0.25 | 1.980 |
| 0.56 | 1.976 |
| 0.75 | 1.981 |
| 1.4 | 1.973 |

The O/U ratio falls slightly at higher pellet diameters. This may be due to a smaller loss by volatilization, oxidation, etc., since the coating is thicker on the larger pellets.

Example 8

In this example a coating of carbon was obtained on pellets by vapour deposition. Carbon was vapourized in a vacuum and allowed to deposit as a very thin layer on the surface of a sintered $UO_2$ pellet. The pellet was then annealed in vacuum at 1,840° C. for three hours. Metallographic examination indicated the presence of free uranium uniformly dispersed throughout the pellet cross-section, and chemical analysis gave an O/U ratio of 1.989.

The methods of Examples 5 to 8 provide uniform lowering of the O/U ratio throughout the pellet, i.e., although the reaction is at the surface, diffusion rates appear rapid enough to equilibrate the composition in less than three hours. This also indicates that $UO_{2-x}$ is a single phase at elevated temperatures, at least down to the values of 2–x tested. This coating and annealing technique for producing the hypostoichiometric material is readily adaptable to large scale production, and may be carried out at temperatures down to about 1,500° C. Other forms of carbon may be used for the coating, which is desirably less than about 0.8 wt., percent, more preferably 0.1 to 0.5 wt. percent of the pellet.

To demonstrate that the present invention is not restricted to uranium dioxide but is applicable to dioxide materials comprising crystalline dioxides of uranium, plutonium, thorium, and mixtures thereof the following example is provided:

Example 9

Sintered pellets of pure thorium dioxide and thorium dioxide plus 2 wt. percent uranium dioxide were coated with 0.25% colloidal graphite and annealed in vacuum at 1,840° C. for three hours giving a hypostoichiometric material in each instance.

What is claimed is:
1. The method of improving the properties of a nuclear reactor fuel element the fuel therefor comprising initially a shaped ceramic mass of a hyperstoichiometric dioxide of a metal selected from the group consisting of uranium, plutonium, thorium and mixtures thereof, which comprises placing a carbon coating on said shaped ceramic mass, said carbon coating being less than about 1% by weight of the ceramic mass, thereafter, heat treating the carbon coated shaped hyperstoichiometric ceramic mass at a temperature of above about 1,500° C. under substantially oxygen free deoxygenating conditions until substantially all of the carbon has been reacted away and a dioxide at least part of which is hypostoichometric results, the oxygen to metal ratio of the dioxide being reduced below 2.0 but above 1.90.

2. The process of claim 1 wherein the carbon coating on said ceramic is from about 0.1 to 0.5 wt. percent of the pellet.

3. The process of claim 1 wherein the carbon coated ceramic mass is heat treated in vacuo.

References Cited

UNITED STATES PATENTS

| 3,063,793 | 11/1962 | Rawson et al. | 252—301.1 |
| 3,141,782 | 7/1964 | Livey et al. | 252—301.1 X |
| 3,354,044 | 11/1967 | Robertson | 252—301.1 X |
| 3,374,178 | 3/1968 | May et al. | 252—301.1 |
| 3,375,306 | 3/1968 | Russell et al. | 252—301.1 X |

BENJAMIN R. PADGETT, Primary Examiner

M. J. SCOLNICK, Assistant Examiner

U.S. Cl. X.R.

23—355; 176—89; 264—.5